(No Model.) 2 Sheets—Sheet 1.

C. F. STILLMAN.
VELOCIPEDE.

No. 324,605. Patented Aug. 18, 1885.

Witnesses
Chas H. Smith
J. Staib

Inventor
Charles F. Stillman
per Lemuel W. Serrell
atty (No Model.) 2 Sheets—Sheet 2.

C. F. STILLMAN.
VELOCIPEDE.

No. 324,605. Patented Aug. 18, 1885.

Witnesses
Chas. H. Smith
J. Staib

Inventor
Charles F. Stillman
per Lemuel W. Serrell
att.

N. PETERS, Photo-Lithographer, Washington, D. C.

UNITED STATES PATENT OFFICE.

CHARLES F. STILLMAN, OF NEW YORK, N. Y.

VELOCIPEDE.

SPECIFICATION forming part of Letters Patent No. 324,605, dated August 18, 1885.

Application filed May 25, 1885. (No model.)

*To all whom it may concern:*

Be it known that I, CHARLES F. STILLMAN, of the city and State of New York, have invented an Improvement in Velocipedes, of which the following is a specification.

This improvement relates to a velocipede especially adapted to children, in which there is a figure of a horse or other animal with a saddle or seat upon it, and two wheels, one at each side of the figure, and a steering-wheel in front. A figure of this kind is especially attractive to children; and by my improvement the velocipede-horse is rendered very compact and easily managed.

In the velocipedes heretofore made that somewhat resemble this improvement the seat and wheels have been behind the horse, and the levers that revolve the axle and wheel have extended backwardly to such axle.

By my improvement I am able to shorten the levers or treadles and to place the wheels at the sides of the figure, so that the axle will pass across below the saddle. This renders the velocipede very compact, lessens the risk of accident or upsetting, and gives the rider better control of the vehicle than in the velocipedes heretofore made. I also construct the axles of the wheels in a simple manner that allows them to revolve with the wheels and cranks, but permits one wheel to turn separately from the other in describing a curve.

Figure 2:
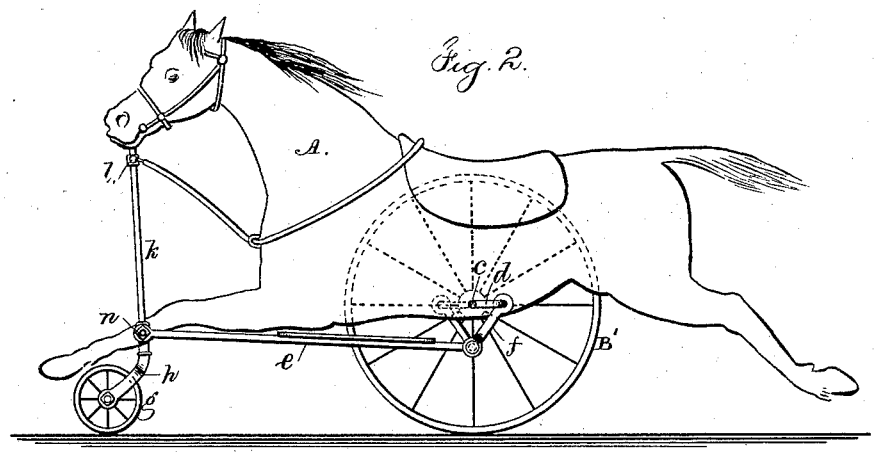
Figure 1:
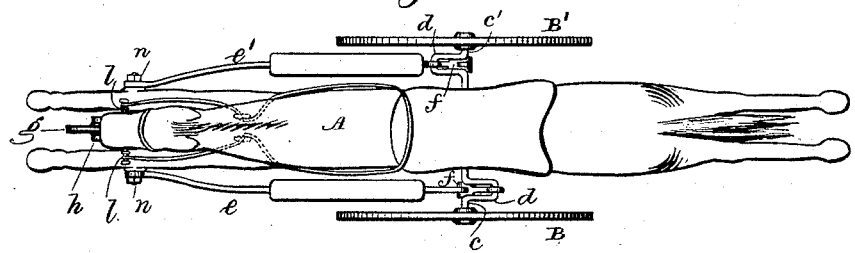
Figure 3:
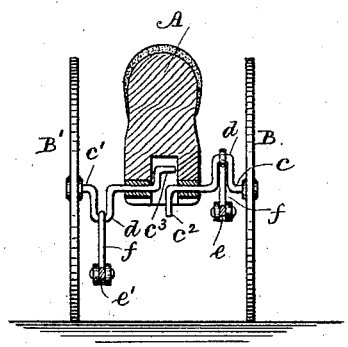
Figure 4:
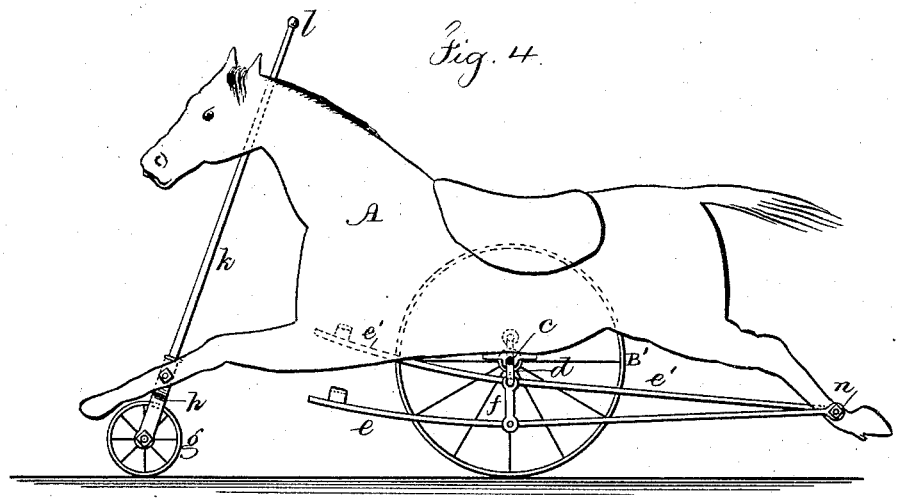

In the drawings, Figure 1 is a plan view of the velocipede. Fig. 2 is a side elevation with one of the driving-wheels removed. Fig. 3 is a cross-section of the form near the shaft or axle, and Fig. 4 is an elevation of the velocipede with the treadle-pivots in the rear.

The figure A is intended to represent a horse. It may be the figure of any other animal.

The back wheels, B B', are provided with axles $c\ c'$, each of which has upon it a crank, $d$, and the axles are supported in bearings at the under part of the figure A, and the axles are separate, except that one terminates as a right-angled arm, $c^2$, and the other as a crank, $c^3$, the crank-pin portion of which describes a cylinder that is intersected by the plane in which the arm $c^2$ revolves, so that ordinarily the two wheels will revolve at the same speed, but in turning curves one wheel may easily travel a greater distance than the other in consequence of the arm and crank forming only a partial connection of the two parts of the axle.

The treadles or side levers, $e\ e'$, are pivoted at the front ends to the front legs of the figure, as at $n$, and at the back ends are short links $f$, that connect the treadles to the respective cranks. These treadles have sufficiently broad upper surfaces to give a proper bearing to the feet of the person riding upon the saddle on the horse's back.

The front wheel, $g$, is received into a fork, $h$, at the lower end of the steering-bar $k$, and there are handles $l$ or other devices for partially rotating the steering-bar $k$ and turning the velocipede.

When the pivots $n$ of the treadles $e\ e'$ are at the rear, as shown in Fig. 4, the feet of the rider have a greater range of movement, and the power is applied to greater advantage.

The wheels are preferably suspension-wheels with wire spokes; but I do not limit myself in this particular.

If the axle is made in one piece, one of the wheels may be sufficiently loose upon the axle to turn thereon in going around curves, and a spring may be made use of between the axle and horse to lessen vibration.

I claim as my invention—

1. The combination, in a velocipede, of two driving-wheels and their axle and cranks, an intermediate figure, such as a horse with a seat or saddle, the axle of the wheels passing across under the body of the horse and beneath such saddle, foot-treadles pivoted at one end to the horse, and links connecting said treadles to the cranks and a front wheel, substantially as set forth.

2. The combination, with a figure, such as a horse, of a steering-wheel and handle at the front, a wheel at each side, a divided crank-axle having at the inner ends a crank and arm, respectively, and treadles at the sides connected to the crank-axle, substantially as set forth.

3. The combination, in a velocipede, of a figure, such as a horse, a front steering-wheel, a rod and guiding-handle connecting the same to the horse, driving-wheels at each side of the horse, and the seat or saddle, a shaft and cranks, foot-treadles, and connections from such treadles to the cranks, substantially as set forth.

Signed by me this 22d day of May, A. D. 1885.

CHAS. F. STILLMAN.

Witnesses:
GEO. T. PINCKNEY.
WILLIAM G. MOTT.